US005910721A

United States Patent [19]

Hayashi et al.

[11] Patent Number: 5,910,721

[45] Date of Patent: Jun. 8, 1999

[54] POSITION CONTROL SYSTEM AND POSITION CONTROL METHOD

[75] Inventors: Tomoo Hayashi, Gotenba; Masaru Suzuki, Mishima; Masahiro Akiyama, Numazu, all of Japan

[73] Assignee: Toshiba Kikai Kabushiki Kaisha, Tokyo, Japan

[21] Appl. No.: 08/915,927

[22] Filed: Aug. 21, 1997

[51] Int. Cl.[6] ........................ B64C 17/06

[52] U.S. Cl. ........................ 318/649; 318/593; 318/578; 90/13 C

[58] Field of Search ........................ 318/649, 609, 318/638, 639, 590, 575, 560; 90/13 C; 364/571.05

[56] References Cited

U.S. PATENT DOCUMENTS 3,688,642 9/1972 Negoro ........................ 90/13 C
4,843,293 6/1989 Futami ........................ 318/609
4,945,501 7/1990 Bell et al. ........................ 364/571.05

*Primary Examiner*—William M. Shoop, Jr.
*Assistant Examiner*—Rita Leykin
*Attorney, Agent, or Firm*—Pillsbury Madison & Sutro LLP

[57] ABSTRACT

In a position control system, the positional deviation between the position of the control point of the controlled object and the target position is corrected in accordance with the change of the relative positional relationship between mechanically related control axes. The control axes include a main shaft stand and a main shaft. The main shaft stand is supported by a column so that it can move in a vertical direction and is driven by the rotation of a screw shaft. The main shaft is provided on the main shaft stand so that the main shaft stand can move in a horizontal direction. The positional deviation of the main shaft from the target position in the vertical direction is calculated in accordance with the horizontal position of the main shaft with respect to the main shaft stand at the time of the position control. The position of the main shaft from the target position in the vertical direction is corrected based on the positional deviation.

6 Claims, 5 Drawing Sheets

57
53
52
54
51
Y
Z
56
55

28 KEYBOARD
26 DISPLAY DEVICE
27 SOFTWARE KEY
BUS
25
GRAPHIC CONTROL CIRCUIT
23
RAM
22
ROM
21
PROCESSOR
31
Z-AXIS CONTROL CIRCUIT
12
SERVO AMPLIFIER
58
58a
58f
30
Y-AXIS CONTROL CIRCUIT
6
SERVO AMPLIFIER
57
57a
57f

POSITION CONTROL SYSTEM AND POSITION CONTROL METHOD

BACKGROUND OF THE INVENTION

1. Field of the Invention

The present invention relates to a position control system in, for example, a numerical control device or an industrial robot system and a control method of the same. More specifically, this is a position control system which performs position control with high precision by correcting positional deviation caused by deformation, etc., due to the weight of the control part itself, and a method of the same.

2. Description of Related Art

For example, in the position control of a numerical control machine tool, usually the position control of the controlled object, such as a cutting tool, is carried out by detecting the rotational position of the servo motor for driving a movement mechanism which moves the cutting tool or other controlled part by a rotation detector, such as an encoder, attached to the servo motor and controlling the rotation of the servo motor based on this detected value.

In such a numerical control machine tool, there are cases where even if the control of the rotation of the servo motor is correctly carried out, correct position control of the cutting tool or other controlled object cannot be carried out due to positional deviation, distortion, etc., due to elastic deformation etc., caused in the mechanical elements forming the numerical control machine tool.

Currently, methods exist to solve this problem. However, they are imprecise, complicated, and involve other problems.

SUMMARY OF THE INVENTION

An object of the present invention is to provide a position control system and a control method for performing position control with high precision by correcting positional deviation of a controlled object due to the weight of the controlled object and bending of parts mechanically engaged with the controlled object.

According to the present invention, a position control system positions a second member of a machine. The machine has a first member elevatable in a vertical direction by an elevating means. The second member is moveable in a vertical direction along with the elevation of the first member and moveable in a horizontal direction with respect to the first member by a horizontal moving means. The position control system includes a first position detecting means which detects the position of the first member; a first controlling means which receives first position data from the first position detecting means as input, controls the elevating means, and positions the first member at a first target position; a second position detecting means which detects the position of the second member; a second controlling means which receives second position data from the second position detecting means as input, controls the horizontal movement means, and positions the second member at a second target position; and a position correcting means which corrects the first target position of the first controlling means by calculating the position correction of the front end of the second member based on the position of the first member and the position of the second member.

Preferably, the position correction in the position correcting means is calculated by measuring the positional deviation in advance and thereby interpolating the position correction.

More preferably, the position correcting means calculates the position correction by using a target position signal of the first member and a target position signal of the second member or by using the first position detection signal and the second position detection signal.

Preferably, the first member and the second member are engaged by a screw shaft screwed into a screw portion.

Preferably, the vertical moving means is driven by a servo motor and the horizontal direction driving means is driven by a servo motor.

Preferably, the first controlling means, the second controlling means, and the position correcting means are constituted by a computer.

In the position control system according to the present invention, correction of the second member in the vertical direction is calculated in accordance with the position of the second member in the horizontal direction. This correction is adjusted in accordance with the position of the first moveable member. As a result, the distortion of the second member due to a mechanical engagement relationship between the first member and the second member, and three-dimensional mechanical distortion can be precisely corrected.

BRIEF DESCRIPTION OF THE DRAWINGS

The above and other objects and features of the present invention will be more apparent from the following description with reference to the accompanying drawings, wherein.

DETAILED DESCRIPTION OF THE PREFERRED EMBODIMENTS

Before describing the preferred embodiments, a more detailed example will be given of the related art with reference to the figures for background purposes.

As stated above, in a numerical control machine tool, there are cases where even if rotational control of the servo motor is correctly carried out, correct position control of the cutting tool, etc., cannot be carried out due to positional deviation, distortion, etc., caused by elastic deformation, etc., in the mechanical elements.

Figure 1:
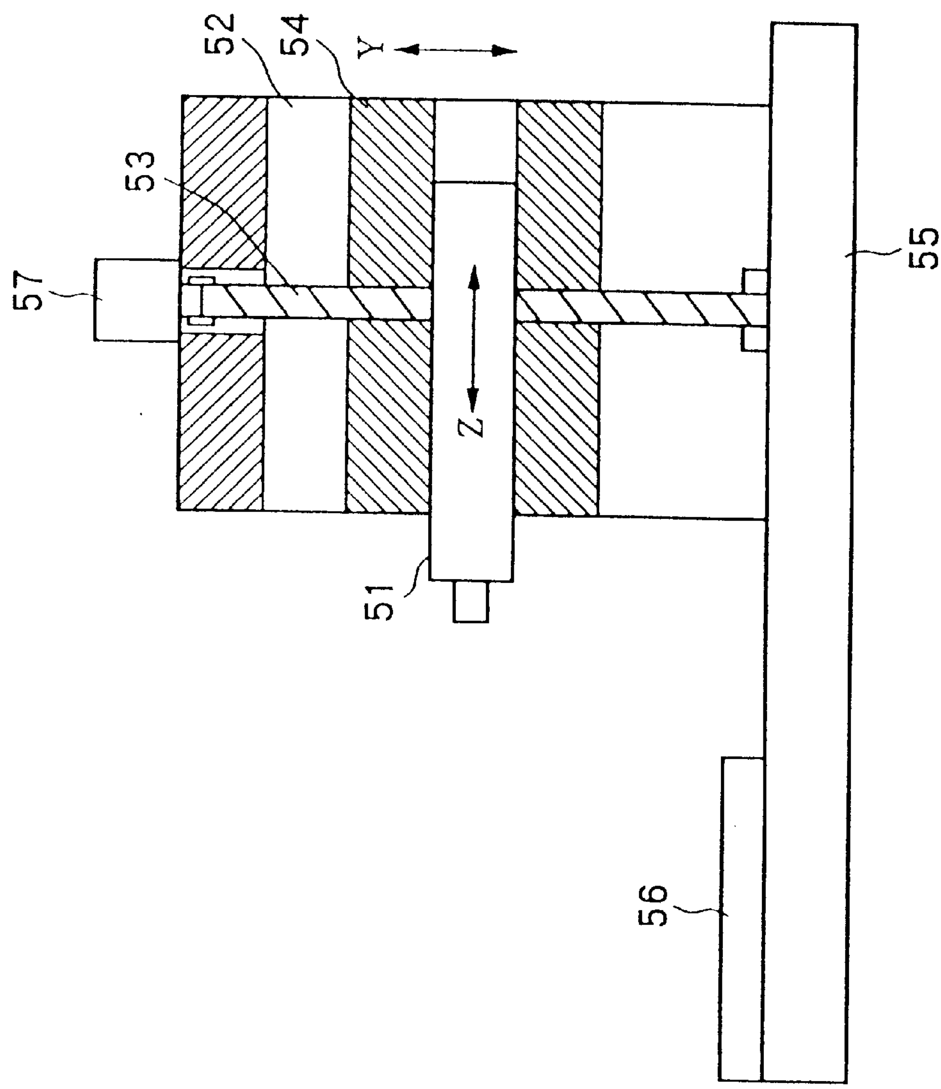
FIG. 1 is an example of the configuration of a horizontal type machining center.

For example, in the case of the horizontal type machining center, as shown in FIG. 1, a main shaft 51 is held in a lateral direction (horizontal direction) by a main shaft stand 54, moveable in a Y-axis direction (vertical direction) by a screw shaft 53 driven by a Y-axis servo motor 57 provided in a column 52. When the main shaft 51 is moved in the upward direction of an X-axis table 56 on which a workpiece is placed by rotational operation of a horizontal direction Z-axis servo motor (not illustrated), the free end of the main shaft 51 bends (distorts) due to its own weight and the accuracy of the main shaft 51 in the horizontal direction cannot be held. As a result, positional deviation occurs between the actual position of the tool attached to the main shaft 51 and an instructed target position. Where the workpiece is processed by using the machining center shown in FIG. 1, there are cases where the processing precision of the workpiece placed on the X-axis table 56 does not meet standards.

In recent machining centers, a particularly high processing precision is required so the effect of the bending (distortion) due to the weight of the control object and/or the controlled part cannot be ignored.

The method of correcting the accuracy of the main shaft 51 in the horizontal direction will be explained next. The amount of downward bending of the free end of the main shaft 51 varies according to the position of the main shaft 51 in the Z-axis direction (horizontal direction). Therefore, the position in the Y-axis direction (vertical direction) is corrected in accordance with the position of the main shaft 51 in the Z-axis direction to correct the accuracy in the horizontal direction. In actuality, for example, the amount of correction corresponding to several positions of the main shaft 51 in the Z-axis direction are measured in advance. Then, the amount of correction is appropriately selected from among the positions of the main shaft 51 in the Z-axis direction at the time of processing a workpiece placed on the X-axis table 56 to correct the position in the Y-axis direction to improve the processing precision of the workpiece.

However, in the configuration of the horizontal type machining center illustrated in FIG. 1, the amount of bending of the main shaft 51 in the downward direction varies with the position of the main shaft 51 in the Y-axis direction (vertical direction). This bending becomes larger when the main shaft 51 is located at a position closer to the lower end portion of the screw shaft 53 than when the main shaft is located at a position closer to the X-axis servo motor 57. Namely, the downward bending of the main shaft 51 includes not only the bending of the free end of the main shaft 51, but also the bending of the screw shaft 53 mechanically engaged with the main shaft 51. Accordingly, as mentioned above, there are cases where the correction of the accuracy of the main shaft 51 by correcting only the position in the Y-axis direction in accordance with the position of the main shaft 51 in the Z-axis direction is not sufficient and further precise correction of the accuracy becomes necessary to process the workpiece with a high precision.

Next, embodiments of the position control system according to the present invention will be explained in detail by referring to the drawings.

Figure 2:
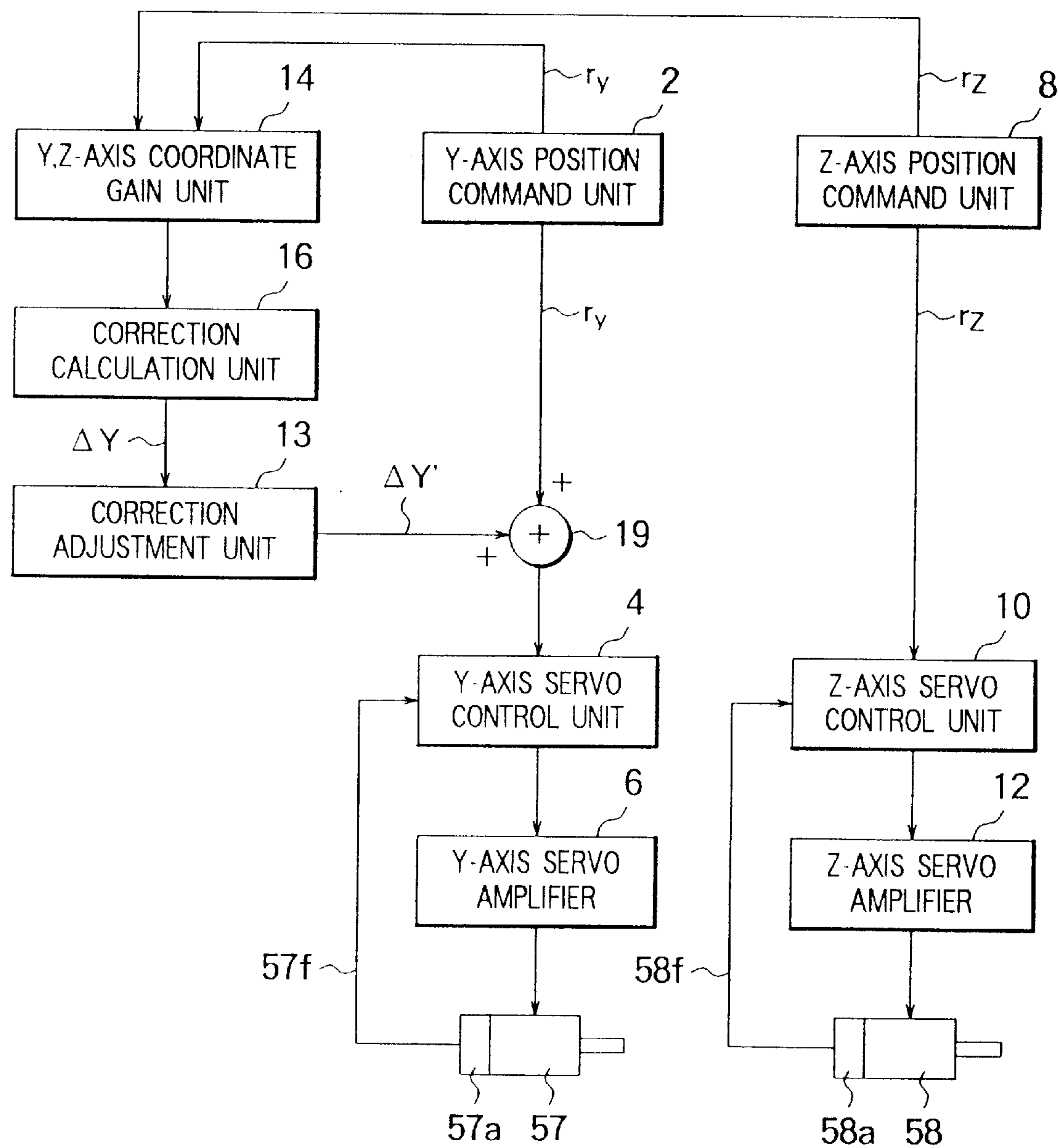
FIG. 2 is the configuration of a position control system according to a first embodiment of the present invention.

FIG. 2 is a configuration of the position control system according to a first embodiment of the present invention.

The position control system illustrated in FIG. 2 performs the position control of the moveable part of the horizontal type machining center illustrated in FIG. 1 in the present embodiment.

The main shaft 51 of the horizontal type machining center shown in FIG. 1 is held in the lateral direction (horizontal direction) by a main shaft stand 54, moveable in the Y-axis direction (vertical direction) by the screw shaft 53 driven by an Y-axis servo motor 57 provided in the column 52 mentioned above. The main shaft 51 is moved in the upward direction of the X-axis table 56 on which the workpiece, etc., is placed by the rotational operation of a horizontal direction Z-axis servo motor (not illustrated). The tool attached to the front end of the main shaft 51, for example, a cutting tool (not illustrated), cuts the workpiece (not illustrated) placed on the X-axis table 56.

The Y-axis servo motor 57 and the screw shaft 53 correspond to the elevating means in the present invention. The main shaft stand 54 corresponds to the first member. The main shaft 51 corresponds to the second member, and a Z-axis servo motor (not illustrated) corresponds to a horizontal direction moving means for moving the first member in the horizontal direction.

The position control system of the present embodiment includes, as illustrated in FIG. 2, a Y-axis control unit which controls the Y-axis servo motor 57 to elevate the main shaft 51 by rotating the screw shaft 53 and a Z-axis control unit which controls the Z-axis servo motor 58 (not illustrated in FIG. 1) to move the main shaft 51 in the Z-axis direction (horizontal direction). The Y-axis control unit which elevates the main shaft 51 and the Z-axis control unit which moves the main shaft 51 in the horizontal direction can be independently operated.

In the present embodiment, a rotation detector **57*a* detects the number of rotations of the Y-axis servo motor 57 and adds up the number of rotations to measure the height of the main shaft stand 54, as the first position detection device, and a rotation detector 58*a* detects the number of rotations of the Z-axis servo motor 58 and adds up the number of rotations to measure the position of the main shaft 51 in the horizontal direction, as the second position detection device. The rotation detector 57*a* and the rotation detector 58*a* could be, for example, an incremental type rotary encoder or an absolute rotary encoder. Note, that where incremental rotary encoders are used as the rotation detectors 57*a*, 58*a*, these rotary encoders output position signals of the Y-axis servo motor 57 and the Z-axis servo motor 58 every rotation as pulse signals. Therefore, by adding these rotation pulse signals at the Y-axis servo control unit 4 and the Z-axis servo control unit 10 illustrated in FIG. 2, a height Py of the main shaft stand 54 and a horizontal position Pz of the main shaft 51 correspond to the total number of rotations of the Y-axis servo motor 57 and the Z-axis servo motor 58. Accordingly, in the present embodiment, the rotation detector 57*a* and the Y-axis servo control unit 4 form the first position detecting means. The rotation detector 58*a* and the Z-axis servo control unit 10 form the second position detecting means. Note, the Y-axis servo control unit 4 and the Z-axis servo control unit 10** perform the control operations mentioned below other than the position detection.

Note that when absolute rotary encoders are used as the rotation detectors **57*a*, 58*a*, the pulse signals are cumulatively added at the rotation detectors so 57*a*, 58*a* and signals indicating the positions are output as a Y-axis directional position detection signal 57*f* and a Z-axis directional position detection signal 58*f*. Therefore, it is not necessary to perform the above cumulative addition at the Y-axis servo control unit 4 and the Z-axis servo control unit 10. In this case, the rotation detector 57*a* forms the first position detecting means, and the rotation detector 58*a*** forms the second position detecting means.

The first position detecting means and the second position detecting means in the present invention may be an incremental rotary encoder or an absolute rotary encoder as mentioned above or other position detecting means. In the following description, for simplifying the illustration and explanation, in the case where absolute rotary encoders are used as the rotation detectors **57*a*, 58*a*, position signals are directly output from the rotation detectors 57*a*, 58*a*, as the Y-axis directional position detection signal 57*f* and the Z-axis directional position detection signal 58*f*. Cumulative addition is not carried out in the Y-axis servo control unit 4 and the Z-axis servo control unit 10**.

Figure 4:
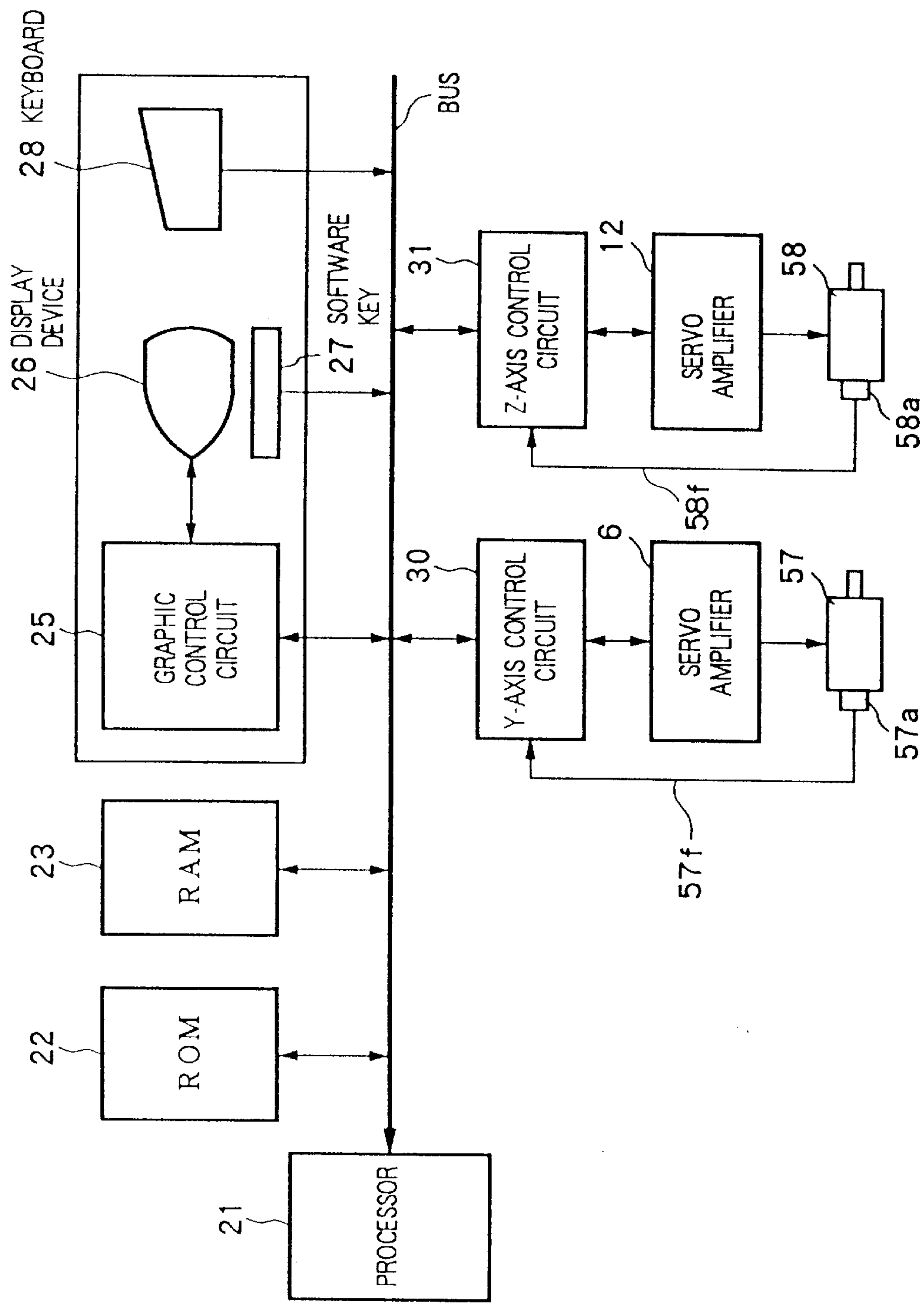
FIG. 4 is an example of the hardware configuration of a position control system according to the present invention.

The Z-axis control unit which performs the position control of the main shaft 51 in the horizontal direction includes a Z-axis position command unit (Z-axis position reference signal generation unit) 8, the Z-axis servo control unit 10, and a Z-axis servo amplifier 12. The Z-axis position command unit 8 supplies a Z-axis directional position command (Z-axis direction reference position signal) $r_z$ to the Z-axis servo control unit 10. The Z-axis directional position command $r_z$ output from the Z-axis position command unit 8 is provided by another apparatus (not illustrated in FIG. 2), for example, a processor 21, as shown in FIG. 4. The Z-axis servo control unit 10 reads the Z-axis directional position detection signal 58*f* detected at the rotation detector 58*a* of the Z-axis servo motor 58, calculates a deflection (error signal) between the Z-axis directional position command $r_2$ supplied from the Z-axis position command unit 8 and the Z-axis directional position detection signal 58*f*, and calculates a control signal so that the deflection becomes 0. The control signal is a current signal for driving the Z-axis servo motor 58 in the present embodiment. Namely, the Z-axis servo control unit 10 calculates a current command giving a deflection of 0 and supplies it to the Z-axis servo amplifier 12. The Z-axis servo amplifier 12 amplifies the current command from the Z-axis servo control unit 10, converts it to an actual drive current of the Z-axis servo motor 58, supplies the drive current to the Z-axis servo motor 58, and makes the servo motor 58 operate. As a result, the rotational control of the Z-axis servo motor 58 is carried out. The above control processing is continuously carried out so that the Z-axis servo motor 58 moves the main shaft 51 up to the position designated by the Z-axis directional position command $r_z$.

The Y-axis control unit which moves the main shaft 51 in the horizontal direction includes a Y-axis position command unit (Y-axis position reference signal generation unit) 2, the Y-axis servo control unit 4, a Y-axis servo amplifier 6, a Y,Z-axis coordinate input unit 14, a correction calculation unit 16, a correction adjustment unit 18, and a signal adder unit 19.

First, the basic operation of the Y-axis control unit, not including the Y,Z-axis coordinate input unit 14, correction calculation unit 16, correction adjustment unit 18, and signal adder unit 19, will be explained.

The basic operation of the Y-axis control unit is similar to the operation of the Z-axis control unit explained above. Namely, the Y-axis position command unit 2 supplies a Y-axis directional position command $r_y$ to the Y-axis servo control unit 4 via the signal adder unit 19. The Y-axis directional position command (Y-axis direction reference position signal) $r_y$ output from the Y-axis position command unit 2 is provided by another apparatus (not illustrated in FIG. 2), for example, the processor 21 of FIG. 4. The Y-axis servo control unit 4 reads the Y-axis directional position detection signal 57*f* detected at the rotation detector 57*a* of the Y-axis servo motor 57, calculates a deflection between the Y-axis directional position command $r_y$ supplied from the Y-axis position command unit 2 and the Y-axis directional position detection signal 57*f*, and calculates the control signal so that the deflection becomes 0. The control signal is a current signal for driving the Y-axis servo motor 57 in the present embodiment. Namely, the Y-axis servo control unit 4 calculates a current command giving a deflection of 0 and supplies it to the Y-axis servo amplifier 6. The Y-axis servo amplifier 6 amplifies the current command from the Y-axis servo control unit 4, converts it to an actual drive current of the Y-axis servo motor 57, and supplies the drive current to the Y-axis servo motor 57 to make it operate. As a result, the rotation control of the Y-axis servo motor 57 is carried out. The above control processing is continuously carried out so that the Y-axis servo motor 57 moves the main shaft 51 in the vertical direction up to the position designated by the Y-axis directional position command $r_y$.

Where there is no distortion etc. in the main shaft 51, the tool, etc., attached to the front end of the main shaft 51 can be positioned at the Z-axis direction target position and Y-direction target position to process the workpiece placed on the X-axis table 56 by the above control device. However, the protruding part of the main shaft 51 hangs downward by its own weight. The protruding part of the main shaft 51 also hangs downward due to the bending of the mechanically engaged screw shaft 53. Therefore, the processing member, such as the cutting tool attached to the front end of the main shaft 51, is too close to the workpiece on the X-axis table 56 so the workpiece cannot be correctly processed. In order to prevent a reduction of the processing precision of the workpiece due to the positional deviation in the height direction because of the bending (or strain) of the main shaft 51 in the downward direction, the position correction, explained in detail below, is carried out in the Y,Z-axis coordinate input unit 14, the correction calculation unit 16, the correction adjustment unit 18, and the signal adder unit 19. The distortion correction processing in the Y,Z-axis coordinate input unit 14, correction calculation unit 16, correction adjustment unit 18, and signal adder unit 19 and the control in the Y-axis direction will be described.

Y,Z-Axis Coordinate Input Unit 14

The Y,Z-axis coordinate input unit 14 receives as its inputs the Y-axis directional position command $r_y$ from the Y-axis position command unit 2 and the Z-axis directional position command $r_z$ from the Z-axis position command unit 8 as its inputs. As a result, the Y,Z-axis coordinate input unit 14 knows the Y-axis directional position and Z-axis directional position of the main shaft 51 to be controlled. In the correction calculation unit 16 and the correction adjustment unit 18, the position correction of the main shaft 51 at the target Y-axis position and the target Z-axis position for performing the processing, etc., of the workpiece is carried out.

In the first embodiment of the present invention, the case where the Y,Z-axis coordinate input unit 14 receives the Y-axis directional position command $r_y$ from the Y-axis position command unit 2 and the Z-axis directional position command $r_z$ from the Z-axis position command unit 8 as its inputs, as indicated by a solid line in FIG. 2, will be described.

The correction calculation unit 16 calculates the position correction $\Delta Y$ to correct the positional deviation of the main shaft 51 in the Y-axis direction by using the Y-axis directional position command $r_y$ of the main shaft 51 in the Y-axis direction supplied from the Y,Z-axis coordinate input unit 14 and outputs this calculated correction $\Delta Y$ to the correction adjustment unit 18.

The correction adjustment unit 18 adjusts the position correction $\Delta Y$ by using the Y-axis directional position command $r_y$ of the main shaft 51 input at the Y,Z-axis coordinate input unit 14.

The signal adder unit 19 adds the position correction $\Delta Y'$, adjusted at the correction adjustment unit 18, to the Y-axis directional position command $r_y$ from the Y-axis position command unit 2 to modify the Y-axis directional position command $r_y$, and supplies the modified Y-axis directional position command $(r_y+\Delta Y')$ to the Y-axis servo control unit 4.

Accordingly, the control operation in the Y-axis servo control unit 4 becomes as follows:

$$\delta Y=(r_y+\Delta Y')-r_y$$

where $r_y$ is the Y-axis directional position command and ΔY' is the position correction.

The method of calculating the position correction (primary position correction value) ΔY and the position adjustment (secondary position correction value) ΔY' will be explained later.

Figure 3:
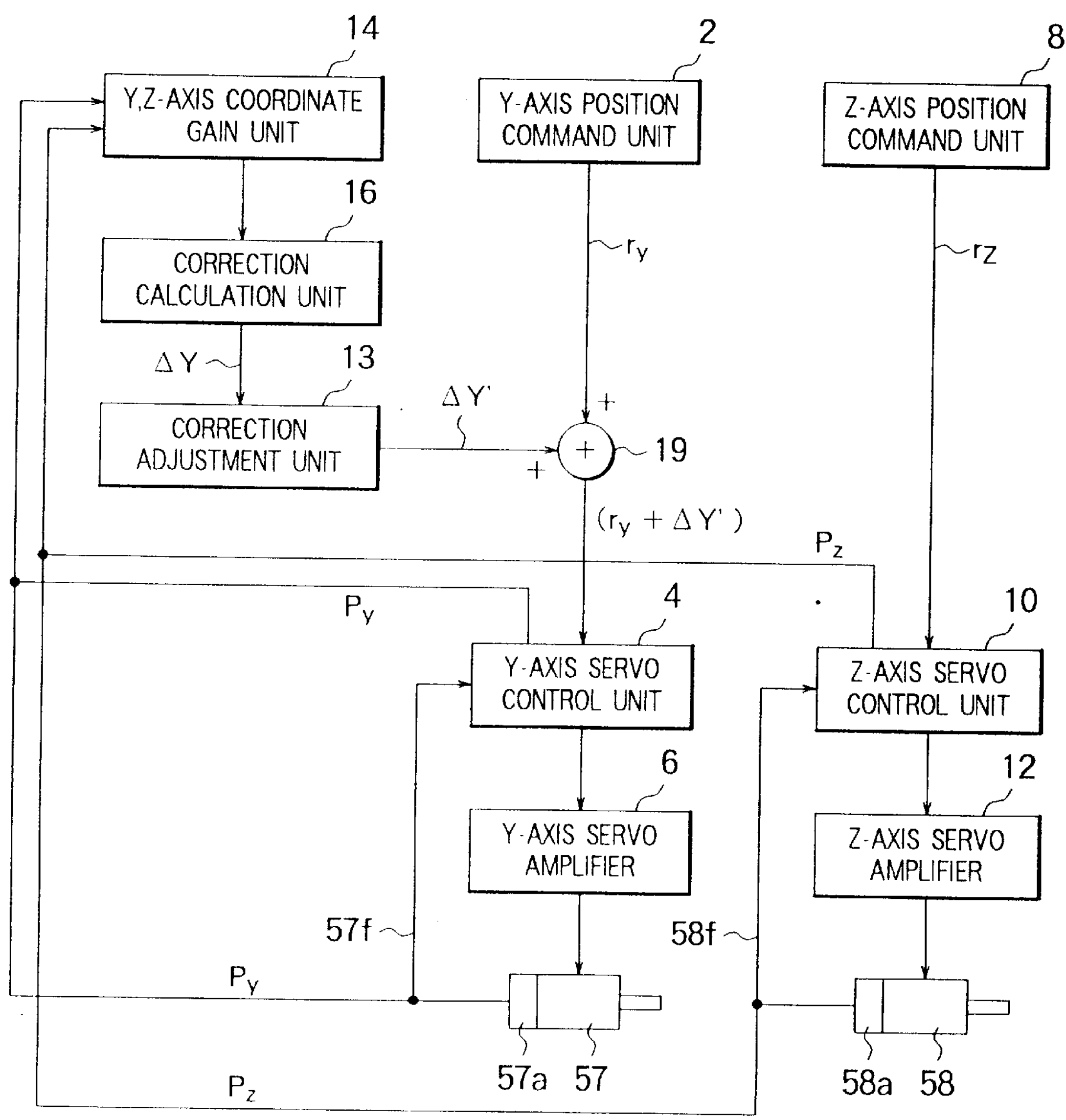
FIG. 3 is the configuration of a position control system according to a second embodiment of the present invention.

Next, as illustrated in FIG. 3, the case where the Y,Z-axis coordinate input unit 14 receives as its inputs the Y-axis directional position detection signal 57*f* and the Z-axis directional position detection signal 58*f* as its inputs will be described.

In place of the inputs of the Y-axis directional position command $r_y$ and the Z-axis directional position command $r_z$, as shown in FIG. 3, when using the incremental rotary encoders as the rotation detectors 57*a*, 58*a*, the Y,Z-axis coordinate input unit 14 receives, as its inputs, the Y-axis direction calculation position data Py from the Y-axis servo control unit 4 and the Z-axis direction calculation position data Pz from the Z-axis servo control unit 10, and uses the actual position data Py and Pz to correct the position of the main shaft 51 in the correction calculation unit 16 and the correction adjustment unit 18. The Y-axis servo control unit 4 and the Z-axis servo control unit 10 add the Y-axis directional position detection signal 57*f* and the Z-axis directional position detection signal 58*f* from the rotation detectors 57*a* and 58*a* to calculate the actual positions Py and Pz, as mentioned above. Further, when using the absolute rotary encoders as the rotation detectors 57*a*, 58*a*, the Y,Z-axis coordinate input unit 14, receives, as its inputs, the Y-axis direction calculation position data Py from the rotation detector 57*a* and the Z-axis direction calculation position data Pz from the rotation detector 58*a*, and uses actual position data Py and Pz to correct the position of the main shaft 51 in the correction calculation unit 16 and the correction adjustment unit 18.

The correction calculation unit 16 uses the current Z-axis directional position detection signal 58*f* of the main shaft 51 supplied from the Y,Z-axis coordinate input unit 14 to calculate the position correction ΔYa to correct the current position deviation of the main shaft 51 in the Y-axis direction, and outputs this calculated correction ΔYa to the correction adjustment unit 18. In the correction adjustment unit 18, the position correction ΔYa is adjusted by using the current Y-axis directional position detection signal 57 of the main shaft 51 input at the Y,Z-axis coordinate input unit 14. The signal adder unit 19 adds the position correction ΔY'a adjusted at the correction adjustment unit 18 to the Y-axis directional position command $r_y$ from the Y-axis position command unit 2 and supplies the result to the Y-axis servo control unit 4.

Accordingly, the control operation in the Y-axis servo control unit 4 becomes as follows:

$$\delta Y=(r_y+\Delta Y'a)-57f$$

where $r_y$ is the Y-axis directional position command, ΔY'a is the position correction, and 57*f* is the Y-axis directional position detection signal.

The correction calculation unit 16 calculates the position correction ΔY to correct the position deviation of the main shaft 51 in the Y-axis direction by using the actual position data Py of the main shaft 51 in the Y-axis direction supplied from the Y,Z-axis coordinate input unit 14, and outputs this calculated correction ΔY to the correction adjustment unit 18.

The correction adjustment unit 18 performs the position adjustment for the position correction ΔY by using the actual position data Py of the main shaft 51 in the Y-axis direction input at the Y,Z-axis coordinate input unit 14.

The signal adder unit 19 adds the position correction ΔY', adjusted at the correction adjustment unit 18, to the Y-axis directional position command $r_y$ from the Y-axis position command unit 2 to modify the Y-axis directional position command $r_y$ and supplies the modified Y-axis directional position command ($r_y$+ΔY') to the Y-axis servo control unit 4.

The method of calculating the position correction (primary position correction value) ΔY and the position adjustment (secondary position correction value) ΔY' will be explained later.

The position control system shown in FIG. 3 can be realized by, for example, computer hardware of the configuration shown in FIG. 4, and a control program stored in the memory in this computer and operated by the computer. Note that this description may also be applied to the first embodiment illustrated in FIG. 2.

The computer system illustrated in FIG. 4 has a processor 21, a read only memory (ROM) 22, a random access memory (RAM) 23, a graphic control circuit 25, a display device 26, a software key 27, a keyboard 28, a Y-axis control circuit 30, and a Z-axis control circuit 31.

The Y-axis control circuit 30 is connected to the Y-axis servo amplifier 6, as illustrated in FIGS. 2 and 3. The Y-axis servo motor 57 is connected to the Y-axis servo amplifier 6. The Y-axis directional position detection signal 57*f* is supplied from the rotation detector 57*a*, attached to the Y-axis servo motor 57, to the Y-axis control circuit 30. The Z-axis control circuit 31 is connected to the Z-axis servo amplifier 12, as illustrated in FIGS. 2 and 3. The Z-axis servo amplifier 12 is connected to it the Z-axis servo motor 58. The Z-axis directional position detection signal 58*f* is supplied from the rotation detector 58*a* attached to the Z-axis servo motor 58 to the Z-axis control circuit 31.

The processor 21 controls the overall position control system by a control program stored in the ROM 22. Various types of data or input/output signals are stored in the RAM 23. For example, correction data, etc., are stored.

The graphic control circuit 25 converts the digital signal to a signal for display and gives the same to the display device 26. As the display device 26, a CRT display device or a liquid crystal display is used. This displays the shape, processing conditions, generated processing program, etc., when the worker prepares the processing program by a dialog format using the software key 27 or the keyboard 28.

The worker of the position control system inputs the data according to the content (dialog data input screen) displayed on the display device 26 to prepare the processing program.

On the screen of the display device 26, the work which can be handled at that screen or the data is displayed in a menu format. The item in the menu is selected by depressing a software key 27 on the menu.

The keyboard 28 is used to input the required data to the control device.

The Y-axis position command unit 2, the signal adder unit 19, and the Z-axis position command unit 8, illustrated in FIGS. 2 and 3, are realized by the processor 21 and the control program stored in the ROM 22 in the present embodiment.

The Y-axis control circuit 30 and the Z-axis control circuit 31 of FIG. 4 correspond to the Y-axis servo control unit 4 and the Z-axis servo control unit 10 shown in FIGS. 2 and 3, respectively, and realize the Y-axis servo control unit 4 and the Z-axis servo control unit 10. These receive the respective position commands from the Y-axis position command unit 2 and signal adder unit 19 and the processor 21 for operation of the Z-axis position command unit 8. The Y-axis directional position command $r_y$ and the Z-axis directional position command $r_z$, calculate the control signals, that is, the drive current of the Y-axis servo motor 57 and the drive current of the Z-axis servo motor 58, giving a zero deflection of the Y-axis directional position detection signal 57*f* of the Y-axis servo motor 57 and the Z-axis directional position detection signal 58*f* of the Z-axis servo motor 58 with respect to these position commands, and supplying the same to the Y-axis servo amplifier 6 and the Z-axis servo amplifier 12 to operate the Y-axis servo motor 57 and the Z-axis servo motor 58.

Note that, it is also possible to configure the Y-axis servo control unit 4 and the Z-axis servo control unit 10 by hardware circuits or configure them by using a microprocessor or other computer and the control program operated there. Alternatively, it is also possible to store the control program for performing the control of the Y-axis control circuit 30 and the Z-axis control circuit 31 in the ROM 22 and operate that program at the processor 21 to realize the Y-axis control circuit 30 and the Z-axis control circuit 31.

The content of processing of the Y,Z-axis coordinate input unit 14, the correction calculation unit 16, and the correction adjustment unit 18 will now be explained in detail. The content of processing of the Y,Z-axis coordinate input unit 14, the correction calculation unit 16, and the correction adjustment unit 18 are realized by the processor 21 and program stored in the ROM 22 in the present embodiment.

The Y,Z-axis coordinate input unit 14 is realized by the processor 21 and the program stored in the ROM 22, and reads and fetches the Y-axis directional position command $r_y$ and the Z-axis directional position command $r_z$ from the Y-axis position command unit 2 and the Z-axis position command unit 8 operating at the processor 21 as the control program. In practice, the Y,Z-axis coordinate input unit 14 reads and fetches the Y-axis directional position command $r_y$ and the Z-axis directional position command $r_y$ stored in the RAM 23.

First, a plurality of correction data for correcting the position of the main shaft 51 in the Y-axis direction are measured in advance and stored in the RAM 23.

This position correction data gives the correction ΔY[i] corresponding to a plurality of positions Pz[i] (i=0, 1, 5) in the Z-axis direction. Specific figures for this are given in, for example, Table 1. Note that the correction data is at the origin position of the main shaft 51 in the Y-axis direction. Further, Pz[0] is the stroke limit position of the main shaft 51 in the negative direction of the Z-axis, and Pz[5] is the stroke limit position in the positive direction of the Z-axis.

TABLE 1

| I | 0 | 1 | 2 | 3 | 4 | 5 |
|---|---|---|---|---|---|---|
| $P_Z(i)$ | −100 mm | 0 mm | 100 mm | 500 mm | 1000 mm | 1500 mm |
| ΔY(i) | 100 μm | 100 μm | 70 μm | 50 μm | 30 μm | 20 μm |

For example, where the position data Py=250 mm in the Y-axis direction, the processing 21 calculates the correction data ΔY by linear interpolation by using the correction data ΔY=70 μm when the position data Py=100 mm in Table 1 and the correction data ΔY=50 μm when the position data Py=500 mm. Namely, ΔY=70+(70−50)×(500−100)×(250−100)=70−7.5=62.5 μm.

In a horizontal machining center having the configuration, as shown in FIG. 1, where the main shaft 51 moves in the Y-axis direction (vertical direction) by the driving of the Y-axis servo motor 57, as mentioned above, the positional deviation of the main shaft 51 in the Y-axis direction (perpendicular direction) changes. For this reason, it is necessary to adjust the correction data shown in Table 1 in accordance with the position of the main shaft 51 in the Y-axis direction.

For this reason, as shown in, for example, Table 2, by defining an adjustment coefficient M[0] when the main shaft is located at the origin position of the Y-axis direction as 1.0, adjustment coefficients M[n] corresponding to a plurality of positions PY[n](n=0. 1, . . . , 5) of the main shaft 51 in the Y-axis direction are measured in advance and stored in the RAM 13.

TABLE 2

| N | 0 | 1 | 2 | 3 | 4 | 5 |
|---|---|---|---|---|---|---|
| $P_Z(l)$ | 0 mm | 500 mm | 1000 mm | 1500 mm | 2000 mm | 2500 mm |
| M(n) | 1.000 | 0.950 | 0.901 | 0.850 | 0.805 | 0.755 |

Note that, the correction data and the coefficients shown in Table 1 and Table 2 are obtained by actually measuring the tool position of the main shaft 51, and measuring the correction and coefficient to be corrected in advance while changing the position of the main shaft 51 in the Y-axis direction and the position in the Z-axis direction at the time of assembly and adjustment of the horizontal machining center shown in, for example, FIG. 1.

Figure 5:
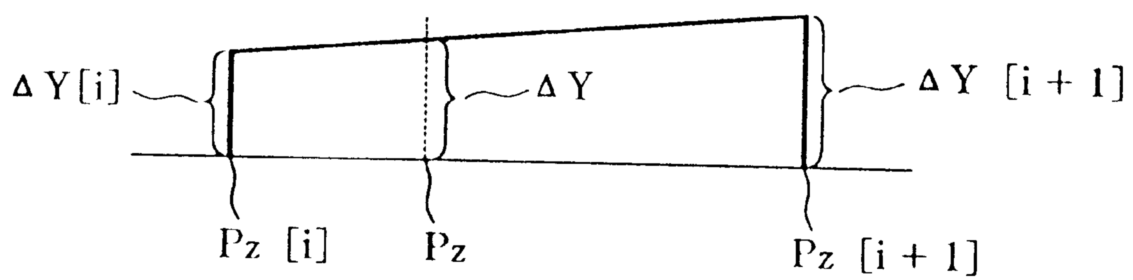
FIG. 5 is an example of the correction data in the position control system according to the present invention.

When the position control of the horizontal machining center is carried out, the correction calculation unit 16 performs linear interpolation of the correction data shown in Table 1, as shown in, for example, FIG. 5, based on the Z-axis directional position Pz of the main shaft 51 read from the RAM 23 at the Y,Z-axis coordinate input unit 14 to calculate the correction ΔY at the Z-axis directional position Pz. Note that, it is assumed that the Z-axis directional position Pz of the main shaft 51 is located between Pz[i] and Pz[i+1].

$$\Delta Y=\Delta[i]+(\Delta Y[i+1]-\Delta Y)[I]X(Pz-Pz[i])/(Pz[i+1]-Pz[i]) \quad (1)$$

ΔY is calculated by Equation (1). This value is output from the correction calculation unit 16 to the correction adjustment unit 18.

Figure 6:
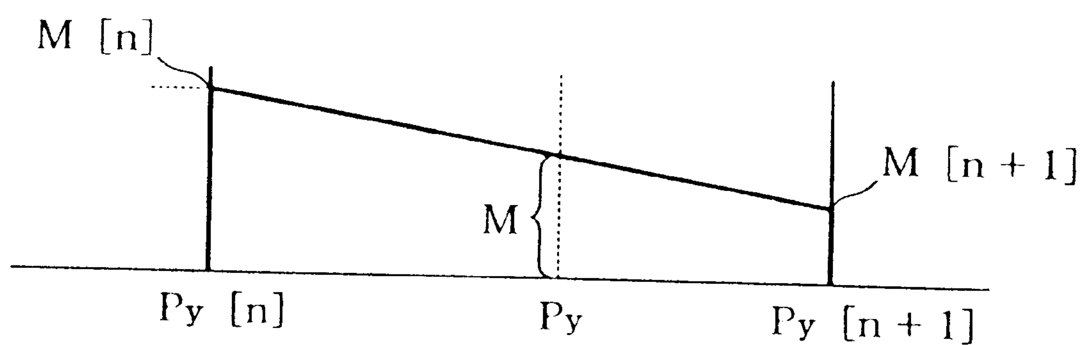
FIG. 6 is an example of an adjustment coefficient of the position correction in a position control system according to the present invention.

The correction adjustment unit 18, first, performs linear interpolation on the coefficient data shown in Table 2, as shown in, for example, FIG. 6, based on the Y-axis directional position Py of the main shaft 51 read at the Y,Z-axis coordinate input unit 14 to calculate the coefficient M at the Y-axis directional position Py. Note that, it is assumed that the position Py of the main shaft 51 in the Y-axis direction is located between Py[i] and Py[i+1].

$$M=M[n]+(M[n+1]-M[n])X(Py-Py[n])/(Py[n+1]-Py[n])$$

In the correction adjustment unit 18, the coefficient M at the position Py is calculated by Equation (2). This coefficient M is multiplied by the correction ΔY calculated by Equation (1) to calculate the adjusted correction ΔY'.

This adjusted correction ΔY' is added from the Y-axis position command unit 2 to the Y-axis directional position command $r_z$ at the signal adder unit 19 and supplied to the Y-axis servo control unit 4. As a result, the rotation position of the Y-axis servo motor 57 is corrected, and the position deviation of the main shaft 51 in the Y-axis direction (perpendicular direction) is precisely corrected. As a result, the three-dimensional position of the tool attached to the front end of the main shaft 51 becomes a precise position correcting the distortion of the main shaft 51 and the processing of the workpiece placed on the X-axis table 56 is precisely carried out.

Note that FIG. 5 and FIG. 6 are examples of the linear interpolation method, but the present invention is not limited to this. The interpolation may also be performed by other interpolation methods using an exponential function, logarithmic function, spline function, etc.

As described above, according to the position control system of the present embodiment, the positional deviation of the main shaft 51 from the target position can be corrected in accordance with not only the position of the main shaft 51 in the Z-axis direction, but also the position in the Y-axis direction. Therefore, it becomes possible to correct the positional deviation with a higher precision than with the conventional correction system.

Further, in the position control system according to the present embodiment, the positional deviation correction data and the adjustment coefficients at a plurality of positions of the main shaft 51 in the Z-axis direction and the Y-axis direction are measured in advance. In actual position control, these correction data and adjustment coefficients are interpolated to calculate the final position correction $\Delta Y'$. Therefore, the advantage of a small storage capacity of the RAM 13 is satisfactory.

Further, in the position control system according to the present embodiment, since a change of the correction data and adjustment coefficients, shown in Table 1 and Table 2, is just a change of the content of the RAM 23, the data can be easily changed and adjustment of the correction of the positional deviation is easy as well. Particularly, it is possible to measure the positional deviation and store the same in the RAM 23 at the actual site of the position control system. As a result, it is possible to precisely correct the positional deviation for every position control system.

Note that, in the present embodiment, the present invention was applied to the case where the accuracy of a horizontal machining center was corrected, but it can also be applied to a controlled object, for example, an industrial robot in which the position of the control point of the controlled object and the positional deviation between the position of the control point to be controlled and the target position changes in accordance with the change of the relative positional relationship between mechanically related control axes.

As explained above, by the position control system according to the present invention, in addition to the fact that the positional deviation from the target position in the perpendicular direction can be corrected in accordance with the position of the second moveable member in the horizontal direction, the positional correction can be adjusted in accordance with the position of the first moveable member in the perpendicular direction. Therefore, it is possible to correct the positional deviation with a higher precision in comparison with the conventional correction system.

As a result, it is possible to improve the processing precision in a machine tool, etc., to which the position control system according to the present invention is applied.

While the invention has been described with reference to specific embodiments chosen for purposes of illustration, it should be apparent that numerous modifications could be made thereto by those skilled in the art without departing from the basic concept and scope of the invention.

We claim:

1. A position control system for positioning a second member of a machine at a first vertical target position and a second horizontal target position, said machine having a first member elevatable in a vertical direction by an elevating means, said second member moveable in a vertical direction by said elevating means and moveable in a horizontal direction with respect to said first member by a horizontal moving means, said position control system comprising:

- a first position detector which detects the position of said first member;
- a first controller which receives first position data from said first position detector as input, controls said elevating means, and positions said first member at said first target position;
- a second position detector which detects the position of said second member;
- a second controller which receives second position data from said second position detector as input, controls said horizontal moving means, and positions said second member at said second target position; and
- a position corrector which corrects said first target position of said first controller by calculating the position correction of the front end of said second member based on the position of said first member and the position of said second member wherein said position correction in said position corrector is calculated by measuring the positional deviation in advance and interpolating the position correction based on the positional deviation.

2. The position control system as claimed in claim 1, wherein said position corrector calculates said position correction by using a target position signal of said first member and a target position signal of said second member.

3. The position control system as claimed in claim 1, wherein said position corrector calculates said position correction by using said first position detection signal and said second position detection signal.

4. The position control system as claimed in claim 1, wherein said first member and said second member are engaged by a screw shaft screwed into a screw portion.

5. The position control system as claimed in claim 1, wherein said elevating means is driven by a servo motor and said horizontal moving means is driven by a servo motor.

6. The position control system as claimed in claim 1, wherein said first controller, said second controller, and said position corrector are constituted by a computer.

* * * * *

UNITED STATES PATENT AND TRADEMARK OFFICE
CERTIFICATE OF CORRECTION

PATENT NO. : 5,910,721
DATED : June 8, 1999
INVENTOR(S) : HAYASHI et al.

It is certified that error appears in the above-identified patent and that said Letters Patent is hereby corrected as shown below:

Title page, item-- [30] Foreign Application Priority Data

Aug. 22, 1996 [JP] Japan . . . 8-221614 --

Signed and Sealed this

Seventeenth Day of October, 2000

Attest:

Q. TODD DICKINSON

*Attesting Officer* *Director of Patents and Trademarks*